US010827190B1

(12) United States Patent
Blasch et al.

(10) Patent No.: US 10,827,190 B1
(45) Date of Patent: Nov. 3, 2020

(54) IMAGE COMPRESSION SELECTION BASED ON INTERPRETABILITY LOSS ESTIMATION

(71) Applicant: Government of the United States, as represented by the Secretary of the Air Force, Rome, NY (US)

(72) Inventors: Erik Philip Blasch, Rome, NY (US); Hua-Mei Harry Chen, Gaithersburg, MD (US); Zhonghai Wang, Boyds, MD (US); Genshe Chen, Germantown, MD (US); Kui Liu, Germantown, MD (US); Dan Shen, Germantown, MD (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 172 days.

(21) Appl. No.: 15/915,160

(22) Filed: Mar. 8, 2018

Related U.S. Application Data

(60) Provisional application No. 62/492,981, filed on May 2, 2017.

(51) Int. Cl.
*H04N 19/42* (2014.01)
*H04N 19/85* (2014.01)
*G06T 7/13* (2017.01)

(52) U.S. Cl.
CPC .............. *H04N 19/42* (2014.11); *G06T 7/13* (2017.01); *H04N 19/85* (2014.11)

(58) Field of Classification Search
CPC ........... H04N 19/42; H04N 19/85; G06T 7/13
See application file for complete search history.

(56) References Cited

U.S. PATENT DOCUMENTS 9,699,453 B1 *  7/2017  Goodman ................. G06T 5/00
2014/0211859 A1 *  7/2014  Carmel ............... H04N 19/124
                                                    375/240.26

OTHER PUBLICATIONS

Thurman et al., "Analysis of the general image quality equation," Proc. SPIE 6978, Visual Information Processing XVII, 69780F (Mar. 25, 2008); doi:10.1117/12.777718.
Doug Griffith, "General Image Quality Equation (GIQE)," JACIE Conference, Apr. 18, 2012.

(Continued)

*Primary Examiner* — Wesley J Tucker
(74) *Attorney, Agent, or Firm* — Adam Gene Pugh

(57) ABSTRACT

A framework for estimating image interpretability degradation associated with image compression is provided. An image compression broker system can determine an image compression setting to achieve an interpretability task in accordance with available communication bandwidth or transmission time objectives. Estimating image interpretability degradation includes detecting edge points of an uncompressed image and determining gradients corresponding to the detected edge points; compressing in accordance with a compression parameter setting the uncompressed image to generate a compressed image and determining gradients corresponding to the edge points in the compressed image; determining from the gradients associated with the edge points gradient ratios; and estimating from the gradient ratios an image interpretability loss of the compressed image.

27 Claims, 11 Drawing Sheets

(56) References Cited

OTHER PUBLICATIONS

E. Blasch, Huamei Chen, Zhonghai Wang, Bin Jia, Kui Liu, Genshe Chen, Dan Shen, "Target Broker Compression for Multi-Level Fusion," IEEE Nat. Aerospace and Electronics Conf., Jul. 2016.

M. Ahmed Ali, F. Eltohamy, and G. I. Salama, "Estimation of NIIRS, for High Resolution Satellite Images, Using the Simplified GIQE", International Journal of Innovative Research in Computer and Communication Engineering, vol. 4, issue 5, May 2016.

J. M. Irvine, D. M. Cannon, S. A. Israel, et al., "Quantifying interpretability for motion imagery with applications to image compression," IEEE Applied Imagery Pattern Recognition Workshop 2008.

R. Driggers, J. Ratches, J. Leachtenauer, R. Kistner, "Synthetic aperture radar target acquisition model based on a National Imagery Interpretability Rating Scale to probability of discrimination conversion," Optical Engineering, vol. 42, No. 7, Jul. 2003.

John M. Irvine, Steven A. Israel, "Quantifying Interpretability Loss due to Image Compression," Chapter 3, ISBN 978-953-51-0422-3, Mar. 23, 2012.

Erik Blasch, Huamei Chen, Zhonghai Wang, Bin Jia, Kui Liu, Genshe Chen, Dan Shen, "Compression Induced Image Quality Degradation in Terms of NIIRS," The Third International Conference on Artificial Intelligence and Pattern Recognition (AIPR2016), Lodz, Poland, Sep. 19-21, 2016.

Erik Blasch, Xiaokun Li, Genshe Chen, Wenhua Li, "Image Quality Assessment for Performance Evaluation of Image Fusion," 2008 11th International Conference on Information Fusion, Cologne, Jun. 30-Jul. 3, 2008, pp. 1-6.

Erik Blasch, Guna Seetharaman, Steve Suddarth, Kannappan Palaniappan, Genshe Chen, Haibin Ling, Arlsan Basharat, "Summary of Methods in Wide-Area Motion Imagery (WAMI)," Proc. SPIE 9089, Geospatial InfoFusion and Video Analytics IV; and Motion Imagery for ISR and Situational Awareness II, Jun. 19, 2014.

Dan Shen, Genshe Chen, Gang Wang, Khanh Pham, Erik Blasch, Zhi Tian, "Network Survivability Oriented Markov Games (NSOMG) in Wideband Satellite Communications," 2014 IEEE/AIAA 33rd Digital Avionics Systems Conference (DASC), Colorado Springs, CO, Oct. 5-9, 2014, pp. 6C2-1-6C2-9.

Charles Fenimore, John Irvine, David Cannon, John Roberts, Ivelisse Aviles, Steven Israel, Michelle Brennan, Larry Simon, James Miller, Donna Haverkamp, Paul F. Tighe, Michael Gross, "Perceptual study of the impact of varying frame rate on motion imagery interpretability," Human Vision and Electronic Imaging, Mar. 1, 2006.

Zhi Tian, Erik Blasch, Wenhua Li, Genshe Chen, Xiaokun Li, "Performance Evaluation of Distributed Compressed Wideband Sensing for Cognitive Radio Networks," 2008 11th International Conference on Information Fusion, Cologne, Jun.30-Jul. 3, 2008, pp. 1-8.

Aaron Hertzmann, Charles E. Jacobs, Nuria Oliver, Brian Curless, David H. Salesin, "Image Analogies," Proceedings of the 28th annual conference on Computer graphics and interactive techniques, p. 327-340, Aug. 2001.

Chengfu Huo, Rang Zhang, Dong Yin, Qian Wu, Dawei Xu, "Hyperspectral Data Compression Using Sparse Representation," 2012 4th Workshop on Hyperspectral Image and Signal Processing (WHISPERS), Shanghai, Jun. 4-7, 2012, pp. 1-4.

J. M. Irvine and E. Nelson, "Image quality and performance modeling for automated target detection," SPIE Defense, Security and Sensing Conference, Paper 7335-21, Apr. 13-17, 2009.

K. Koonsanit, C. Jaruskulchai, and A. Eiumnoh, "Band Selection for Dimension Reduction in Hyper Spectral Image Using Integrated Information Gain and Principal Components Analysis Technique," International Journal of Machine Learning and Computing, vol. 2, No. 3, pp. 248-251, Jun. 2012.

Peter Kragel, M.D., Bill Oliver, M.D., "A Pathology Imagery Interpretability Rating Scale for Virtual Microscopy," IADP 2011 Quebec City, Canada, Aug. 3-5, 2011.

L.A. Mayer, C.D. Erdman, K. Riehl, "Imagery Interpretability Rating Scales", Digest of Technical Papers, International Symposium Society for Information Display, Society for Information Display, vol. XXVI, pp. 117-120, May 23, 1995.

Y. Li, "Synthetic Aperture Radar (SAR) Image Compression Using the Wavelet Transform" Master thesis, Memorial University of Newfoundland, Canada. Aug. 1997.

http://apb.directionsmag.com/entry/lidar-data-gets-squeezed-by-lizardtechs-lidar-image-compressor-esriuc/155708, downloaded from the internet on Jul. 13, 2017.

B. Kahler and E. Blasch, "Predicted Radar/Optical Feature Fusion Gains for Target Identification," Proc. IEEE Nat. Aerospace Electronics Conf (NAECON), Jul. 14-16, 2010.

J. M. Irvine, B.A. Eckstein, R. Hummel, R. Peters, R. Ritzel, "Evaluation of the Tactical Utility of Compressed Imagery" Optical Engineering, vol. 41, No. 6, Jun. 2002.

Norman B. Nill, Brian H. Bouzas, Objective Image Quality Measure Derived from Digital Image Power Spectra, Optical Engineering, vol. 31 No. 4, pp. 813-825, 1992.

"A Primer for Dissemination Services for Wide Area Motion Imagery", at http://www.opengis.net/doc/bp/wami-primer/1.0, Dec. 5, 2012.

A. Said and W. A. Pearlman, "A New Fast and Efficient Image Codec Based on Set Partitioning in Hierarchical Trees", IEEE Transactions on Circuits and Systems for Video Technology, vol. 6, Jun. 1996.

J.M. Shapiro, "Embedded Image Coding Using Zerotrees of Wavelets Coefficients," IEEE Trans. Signal Processing, vol. 41, Dec. 1993.

X. Shi, H. Ling, E. Blasch, and W. Hu, "Context-Driven Moving Vehicle Detection in Wide Area Motion Imagery," Int'l Conf on Pattern Recognition (ICPR), 2012.

L. Gibson, J.M. Irvine, G.O. Brien, S. Schroeder, A. Bozell, S.A. Israel, L.Jaeger (2006) "User Evaluation of Differential Compression for Motion Imagery" SPIE Defense, Security and Sensing Conference, Apr. 17-21, 2006.

G. O'Brien, S.A. Israel, J.M Irvine, C. Fenimore, J. Roberts, M. Brennan, D. Cannon, J. Miller, "Metrics to Estimate Image Quality in Compressed Video Sequences" SPIE Defense, Security and Sensing Conference, Orlando, FL, Apr. 9-13, 2007.

D. Young, T. Bakir, R. Butto, C. Duffield, and F. Petitti, "Loss of Interpretability due to compression effects as measured by the new video NIIRS," Proc. SPIE 7529, Jan. 18, 2010.

A.R. Nolan, G.S. Goley, and M. Bakich, "Performance Estimation of SAR imagery using NIIRS techniques," Proc. Of SPIE 8394. Algorithms for Synthetic Aperture Radar Imagery XIX Baltimore, Maryland, USA, Apr. 23, 2012.

E.Blasch and B. Kahler, "Application of VNIIRS for Target Tracking", Geospatial Informatics, Fusion, and Motion Video Analytics V, Edited by M. F. Pellechia, et al , Proc. of SPIE vol. 9473, May 2015.

J.M. Irvine "National Imagery Interpretability Rating Scales (NIIRS): Overview and Methodology" Proceedings of the International Society for Optical Engineering (SPIE), Jul. 29-30, 1997, vol. 3128, pp. 93-103.

SPIHT Image Compression. http://www.cipr.rpi.edu/research/SPIHT/spiht3.html#mat-spiht, 1995.

\* cited by examiner

| Selected Scene | | |
|---|---|---|
| 1 | | |
| 2 | Data Path | C:/Users/Huamei Chan/OneDriv |
| 3 | Data File | scene002.mp4 |
| 4 | Width | 854 |
| 5 | Height | 480 |
| 6 | Frame Rate | 25 |
| 7 | Duration | 45 |
| 8 | Bitrate (kbits/sec) | 26547 |
| 9 | VNIRS (2 ~ 11) | 7.41 |
| 10 | GSD (3 ~ 80in) | 10.00 |
| 11 | RER (0.2 ~ 1.3) | 0.80 |
| 12 | H (0.9 ~ 1.9) | 1.00 |
| 13 | G (1 ~ 19) | 4.00 |

| | | Run Broker | Recommended Encoder: | | libx264 |
|---|---|---|---|---|---|
| | 1 | 2 | 3 | 4 | 5 |
| 1 | Codec | mpeg1 | msmpeg1 | libxvid | libx264 |
| 2 | Mode | Variable Bit Rate | Variable Bit Rate | Variable Bit Rate | Constant Rate Factor |
| 3 | Q Parameter | 7 | 16 | 7 | 36 |
| 4 | Predicted bitrate (kbits/s) | 612 | 518 | 674 | 206 |
| 5 | Present | N/A | N/A | N/A | ultrafast |
| 6 | Encoding speed (frames/sec) | 97 | 85 | 51 | 91 |

FIG. 11

Selected Scene

| | 1 | Edit |
|---|---|---|
| 2 | Imagery Type | EO |
| 3 | Data Path | C:/Users/Huamei Chan/OneDrive/Docum |
| 4 | Data File | Rural01.PNG |
| 5 | Width | 720 |
| 6 | Height | 480 |
| 7 | NIIRS (0 ~ 9) | 5.90 |
| 8 | Bitrate (bits/pixel) | 4.63 |
| 9 | GSD (3 ~ 80in) | 18.00 |
| 10 | RER (0.2 ~ 1.3) | 0.94 |

User Requirement

| | 1 | Edit |
|---|---|---|
| 1 | min NIIRS | 4.00 |

Compressed Data

| | 1 | Run Encoder |
|---|---|---|
| 1 | Original NIIRS | 5.90 |
| 2 | Target NIIRS | 4.00 |
| 3 | Actual NIIRS | 3.94 |
| 4 | Bitrate (bits/pixel) | 0.09 |

Selected Encoder: jpeg2000

Selected Scene

Compressed Data

Encoder Comparison

| | 1 | 2 | Recommended Encoder: | 3 | jpeg2000 |
|---|---|---|---|---|---|
| | | Run Broker | | | |
| 1 | Codec | jpeg | | | jpeg2000 |
| 2 | Quality Parameter [1 ~ 100(best)] | 6 | | | N/A |
| 3 | Compression Parameter [1(best) ~ 200] | N/A | | | 89 |
| 4 | Predicted bitrate (bits/pixel) | 0.17 | | | 0.09 |
| 5 | Predicted NIIRS | 4.23 | | | 4.02 |

IMAGE COMPRESSION SELECTION BASED ON INTERPRETABILITY LOSS ESTIMATION

CROSS-REFERENCE TO RELATED APPLICATION

This non-provisional patent application claims the benefit of U.S. Provisional Application No. 62/492,981, filed May 2, 2017.

STATEMENT OF GOVERNMENT INTEREST

The invention described herein may be manufactured, used, and licensed by or for the Government of the United States for all governmental purposes without the payment of any royalty.

BACKGROUND

The amount of the raw data that may be obtained with advanced imaging systems is ever increasing. One example of a large image format is Wide Area Motion Imagery (WAMI) which generates images over city-sized areas to enable monitoring of vehicle and pedestrian movements. A typical WAMI image data size is over 144 Megapixels (12,000×12,000 pixels), and the next generation WAMI image data size will be at the level of 1.6 Giga-pixels (40,000×40,000 pixels). Other types of imaging sensors, which may include Synthetic Aperture Radars (SARs), Light Detection and Ranging (LiDAR) sensors, and hyperspectral cameras, also capture huge amounts of image data.

The National Imagery Interpretability Rating Scale (NIIRS) is a subjective quantification of image interpretability according to the types of tasks a certified image analyst (IA) is able to perform with the imagery at a given rating scale. NIIRS has been defined for the following four types of imaging modalities: Visible (EO), Infrared (IR), Synthetic Aperture Radar (SAR), and Multi-Spectral Imagery (MSI). Each imagery type has a 10-level scale with each scale defined by a set of information extraction tasks called criteria. They usually consist of the intended usage, (with keywords like distinguish, detect, recognize, classify, identify) for a target type and size for a given imagery modality.

To transmit the raw data to the users, image analysts, or processing units, either a wideband channel or a long transmission time is needed. To reduce the required communication bandwidth or the transmission time, the raw data should be compressed. Lossless compression is able to preserve all the information, but has limited data reduction power. On the other hand, lossy compression, which may result in a very high compression ratio, suffers from interpretability loss as quantified by NIIRS.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

FIG. 11 illustrates a sample graphical user interface, in accordance with embodiments of the disclosure;

FIG. 12 illustrates use of a data compression broker for a WAMI application, in accordance with embodiments of the disclosure.

DETAILED DESCRIPTION

Figure 1:
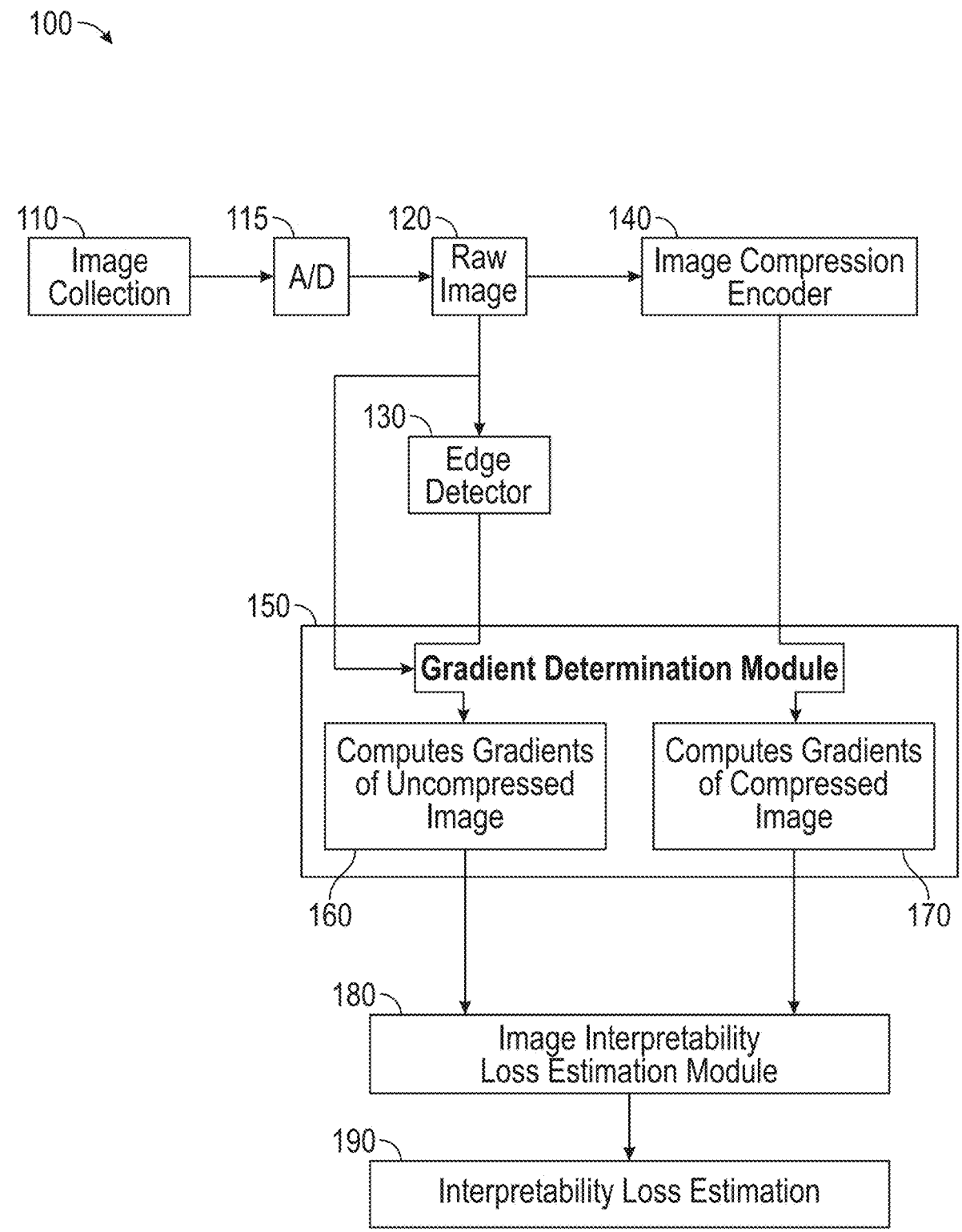
FIG. 1 illustrates an example image compression degradation estimation and broker system, in accordance with embodiments of the disclosure.

Specific embodiments of the disclosure will now be described in detail with reference to the accompanying figures. While this invention is susceptible of being embodied in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

The present disclosure relates generally to imaging systems with image compression capability in which it is desired to maintain specified image interpretability. Specifically, the present disclosure relates to a compression induced image interpretability loss estimation system and methodology that brokers selection of an image compression rate. As discussed herein, methodologies to recommend a best or advantageous image compression parameter setting may be made in view of a maximum interpretability loss value expressed in terms of an interpretability change or in view of a maximum bitrate or, equivalently, a maximum available bandwidth of an image compression degradation estimation and broker system. Image interpretability loss due to image compression can be predicted or estimated in accordance with various embodiments presented herein.

The block diagram of FIG. 1 illustrates an example of the present disclosure's image compression degradation estimation and broker system 100, also referred to as an image compression degradation estimation system or simply as an estimation system, in accordance with embodiments of the disclosure. Those skilled in the art will understand that the principles of the present disclosure may be implemented in any type of suitably arranged device or system. As used herein, compression may refer to a variety of lossy compression schemes, including, but not limited to, Joint Photographic Experts Group (JPEG), JPEG 2000 for 2D images, set partitioning in hierarchical trees (SPIHT) image compression, and High Efficiency Video Coding (HEVC), such as H.264 and H.265 video compression for still image compression. Imagery types may include FMV, WAMI, moving synthetic aperture radar (SAR) for video. For still imagery, SAR, LiDAR, and hyper- and multi-spectral, such as multi-spectral sensor surveillance system (M4S), may be used for surveillance applications; air, satellite and handheld configurations may be used for platform applications; positron emission tomography (PET), magnetic resonance imaging (MRI), and ultrasound may be used for biomedical applications; and tetrahertz (THz) imaging and eddy current testing may be used for inspection applications.

Figure 2:
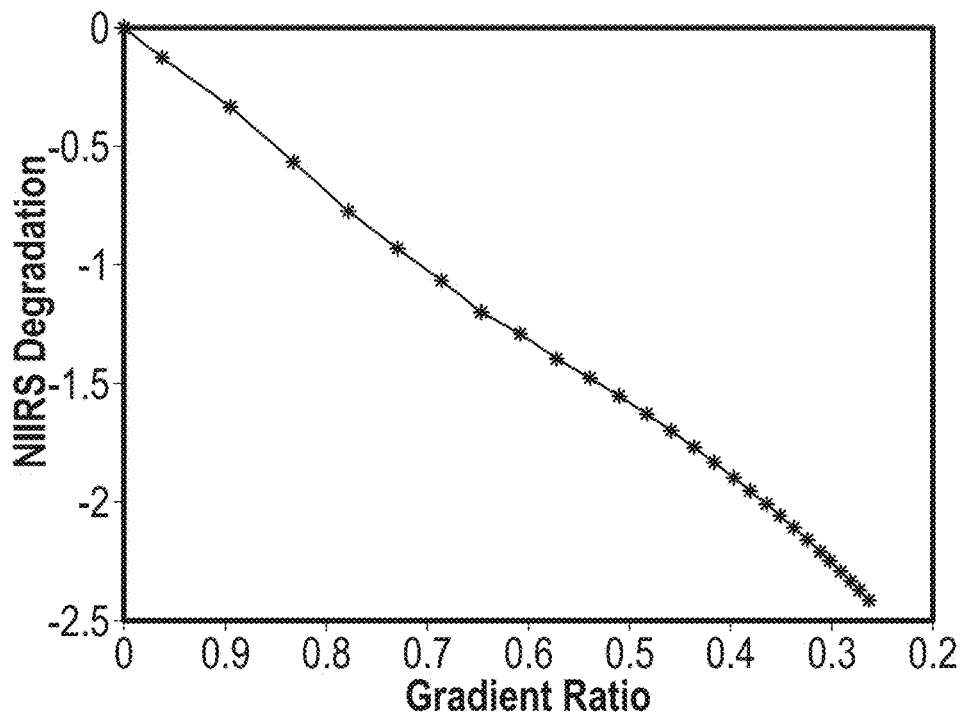
FIG. 2 depicts Compression Degradation Image Function Index based on General Image Quality Equation (GIQE) version 3, in accordance with embodiments of the disclosure.

As described in more detail below, the estimation system 100 is useful for estimation of compression induced interpretability loss and thus suitable for predicting NIIRS loss based on the gradient information at edge points before and after compression, as in FIG. 2. As shown in FIG. 1, the image compression degradation estimation and broker system 100 includes an image collection element 110 that collects images; an analog-to-digital converter (A/D) 115 converts collected images to a raw/uncompressed image 120 suitable for encoding by image compression encoder 140 and for detecting image edges by edge detector 130; a gradient determination module 150; and an image interpretability loss estimation module 180. As shown, gradient determination module 150 has modules 160 and 170 that can compute gradients of uncompressed/raw images and gradients of compressed images, respectively. As will be discussed, modules 160 and 170 can compute mean gradient values at vertical and horizontal edge points of an image. Image interpretability loss estimation module 180 can be used to estimate or predict loss estimation that can be provided as an output labeled Interpretability Loss Estimation 190. A target compression broker is provided by the data compression provided by image compression encoder 140, gradient determination module 150, and image interpretability loss estimation module 180.

While reference is made herein to the NIIRS, image interpretability loss estimation can be performed by module 180 for other image interpretability rating scales (IIRS), including, for example video-NIIRS (VNIIRS). Accordingly, reference to the NIIRS interpretability rating scale in describing various embodiments is by way of example and is not intended to limit application to only those examples that use NIIRS. The image compression loss estimation methods and systems described herein are applicable to applications that use other image interpretability rating scale IIRSs (e.g., Objective Evaluation Index, Shannon-based Thematic Mapping Index). For example, imagery interpretability rating scales are used for imagery related to detection of breast cancer, pathology, and other medical conditions. Also, the forensic image examination rating scale (FIERS) is used for forensic imagery analysis.

Still referring to FIG. 1, the present disclosure's image compression degradation estimation and broker system 100 works as follows in accordance with various example embodiments. A raw/uncompressed digitized image 120 is fed into both edge detector 130 and image compression encoder 140. In accordance with some embodiments, a user may specify a maximum available bandwidth of the system. An encoder setting of image compression encoder 140 that results in a minimum interpretability loss, for example a minimum NIIRS interpretability loss, while keeping the system bitrate below the specified maximum available bandwidth may be selected by a user. Alternately, or in addition to this setting, a user may specify a maximum acceptable image interpretability loss, such as a maximum acceptable NIIRS loss. An encoder setting of encoder 140, referred to as a compression parameter setting (e.g., resolution, bitrate, framerate), may be selected by a user that results in a maximum compression rate while maintaining interpretability loss below the maximum interpretability loss value specified by the user. Thus, image compression encoder 140 generates, in accordance with a compression parameter setting, a compressed image from the raw/uncompressed image 120.

Next, modules 160 and 170 of gradient determination module 150 compute the gradients of both the uncompressed image and the compressed image, respectively, as shown. Two mean gradient values are calculated per image. Modules 160 and 170 of gradient determination module 150 determine gradients of a first edge point of both the uncompressed and compressed images received by the gradient determination module, determine gradients of a second edge point of both the uncompressed and compressed images, determine a first mean gradient value of the first edge point from the gradients of the uncompressed and compressed images associated with the first edge point, and determine a second mean gradient value of the second edge point from the gradients of the uncompressed and compressed images associated with the second edge point. The first and second edge points are located in the same position in both the uncompressed and compressed images. More specifically, a first mean gradient value is determined between values at vertical edge points $G_v^0$ and $G_v^1$ and a second mean gradient value is determined between the values at the horizontal edge points $G_h^0$ and $G_h^1$, where the superscripts 0 and 1 indicate uncompressed and compressed images, respectively, and the subscripts h and v indicate the horizontal and vertical edge points.

Loss estimation module 180 estimates an image interpretability loss of the compressed image based upon the first mean gradient value of the first edge point and the second mean gradient value of the second edge point. More specifically, in this example, loss estimation module 180 estimates the interpretability loss, designated Δ NIIRS in embodiments making use of the NIIRS rating scale, in accordance with Equation 1.

$$\Delta NIIRS = \pi \left( \frac{\sqrt[2]{G_h^1 \cdot G_v^1}}{\sqrt[2]{G_h^0 \cdot G_v^0}} \right) \tag{1}$$

More generally, where the IIRS may be NIIRS or another interpretability rating scale, this equation may be as follows:

$$\Delta IS = \pi \left( \frac{\sqrt[2]{G_h^1 \cdot G_v^1}}{\sqrt[2]{G_h^0 \cdot G_v^0}} \right),$$

where $G_v^0$ is the vertical edge point of the uncompressed image, $G_v^1$ is the vertical edge point of the compressed image, $G_h^0$ is the horizontal edge point of the uncompressed image, and $G_h^1$ is the horizontal edge point of the compressed image. FIG. 2 depicts obtained Compression Degradation Image Function Index (CoDIFI) model using Equation 1 based on General Image Quality Equation (GIQE) version 3, $GIQE_3$, for example, in which GSD is defined in the plane orthogonal to the line of sight (LOS); in version 4 of GIQE, GIQE4, GSD is defined in the ground plane. As will be seen, with $GIQE_3$, two constants, ground sample data GSD and noise gain G, are not dependent on the relative edge response (RER) of the image data. These are both sensor setting related parameters that are not affected by compression.

As shown in Equation 1, the interpretability loss Δ NIIRS is modeled as a function of the ratio of the geometric mean of the vertical and horizontal gradients at edge points obtained for a raw, uncompressed image and a corresponding compressed image.

Using an unenhanced version of GIQE, the interpretability difference, or loss (Δ NIIRS), between the raw image and the compressed image can be expressed as NIIRS_0 minus NIIRS_1 where $$NIIRS_0 = 11.81 + 3.32 \cdot \log_{10}\left(\frac{RER_{GM}}{GSD_{GM}}\right) - 1.48 \cdot H_0 - \frac{G}{SNR_0} \quad (2)$$

$$NIIRS_1 = 11.81 + 3.32 \cdot \log_{10}\left(\frac{RER_{GM}}{GSD_{GM}}\right) - 1.48 \cdot H_1 - \frac{G}{SNR_1} \quad (3)$$

By expressing the signal to noise ratio after compression SNR_1 as its Taylor series at SNR_0, the change of NIIRS due to compression ΔNIIRS is defined as:

$$\Delta NIIRS = 3.32 \cdot \log_{10}\left(\frac{RER_1}{RER_0}\right) + G \cdot \frac{\Delta SNR}{SNR_0^2} \approx 3.32 \cdot \log_{10}\left(\frac{RER_1}{RER_0}\right) \quad (4)$$

where
$GSD_{GM}$=geometric mean of ground sample distance in inches
$RER_{GM}$=geometric mean of the normalize relative edge response
$H_{GM}$=geometric mean of edge overshoot due to modulation transfer function compensation MTFC/enhancement
G=noise gain due to MTFC/enhancement
SNR=signal-to-noise ratio
$\Delta SNR = SNR_0 - SNR_1$, where ΔSNR is much less than $SNR_0$.

The change of NIIRS due to compression, ΔNIIRS of Equation 4, may be referenced the General Image Quality Degradation Equation (GIQDE) due to compression. Note that parameters GSD and G are not changed as they are both sensor setting related parameters and thus not affected by compression. From Equation 4, it can be seen that parameters, GSD, G and SNR are no longer required in order to predict interpretability loss due to compression.

Figure 3:
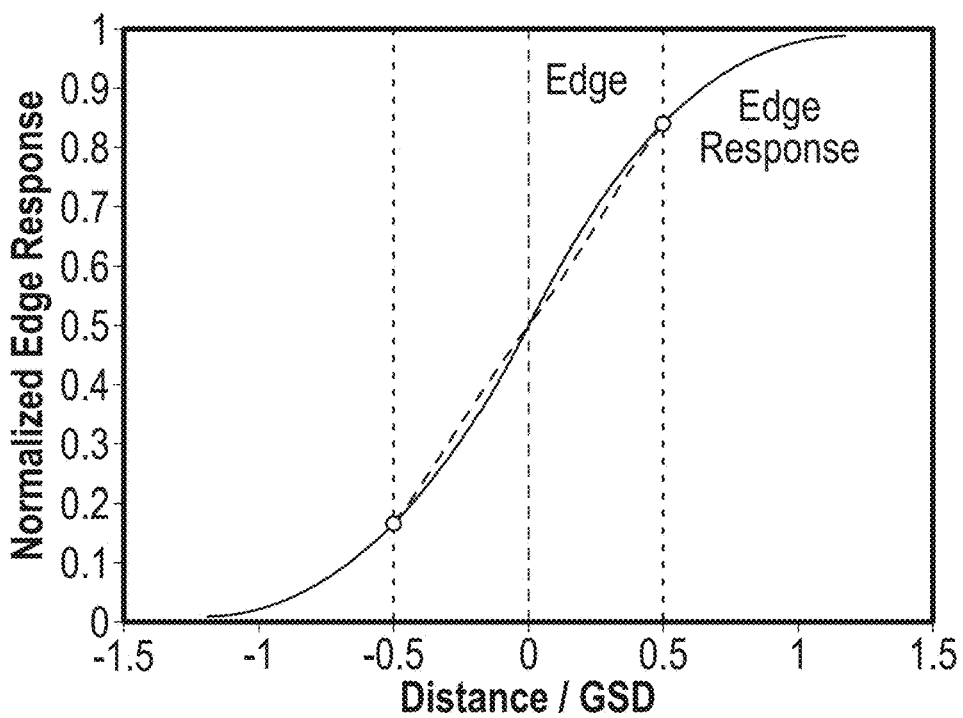
FIG. 3 depicts the normalized edge response for Relative Edge Response (RER) estimation used to determine the NIIRS change, in accordance with embodiments of the disclosure.

FIG. 3 depicts the normalized edge response for Relative Edge Response (RER) estimation used to determine the NIIRS change and clearly indicates that the RER is strongly related to gradients at edge points and the ground sampling distance (GSD). These terms are reflected in Equation 4, the change of NIIRS due to compression.

Figure 7:
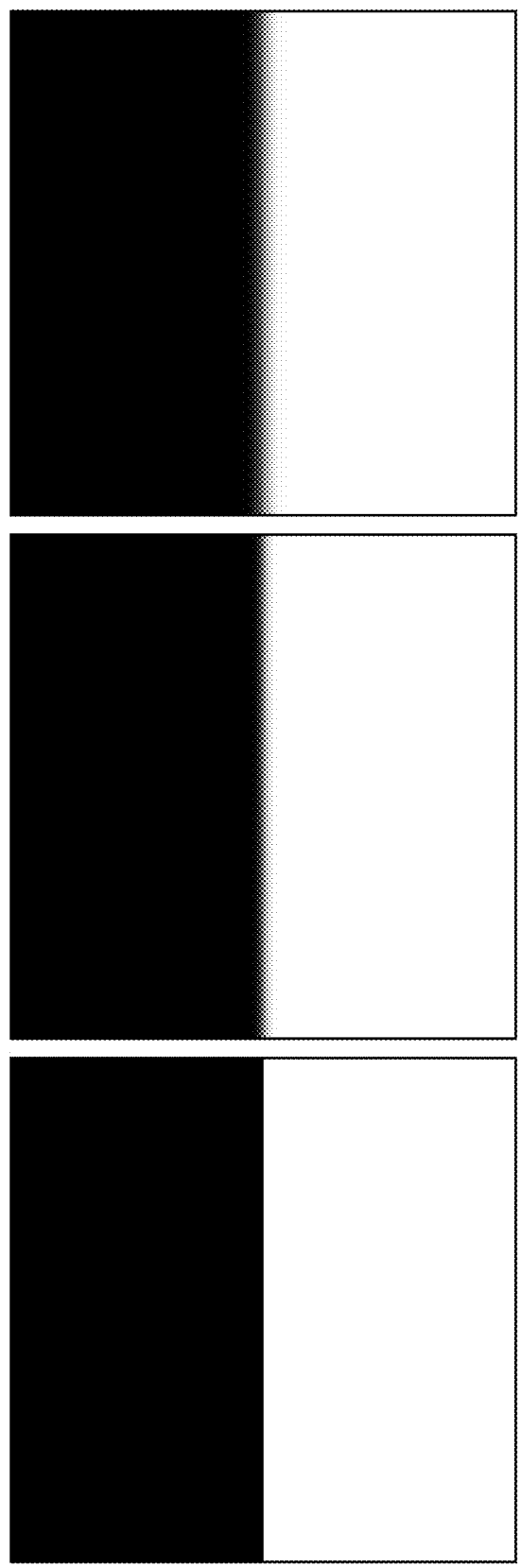
FIGS. 7A-7C illustrate sample degraded images used to generate training data, in accordance with embodiments of the disclosure.

Once model π in Equation 1 is available, reduction of interpretability rating can be predicted simply by the ratio of gradients at the same edge points obtained before and after compression. For this application, a neural network (NN) may be employed to obtain this model, in which the training data is obtained by applying the image analytics to a series of sequentially degraded images. The degraded images may be generated by sequentially blurring the simulated edge image with fixed sized ([23×23] pixels) Gaussian low-pass filters having different standard deviation values ranging from 0.2 to 3, such as illustrated in FIGS. 7A-7C. Other training functions (e.g., Restricted Boltzmann Machine, Convolutional NN, Long Short-Term Memory NN, deep belief network) can replace the neural network to enhance the fidelity of the model, without departing from the scope of the embodiments presented herein.

Figure 4:
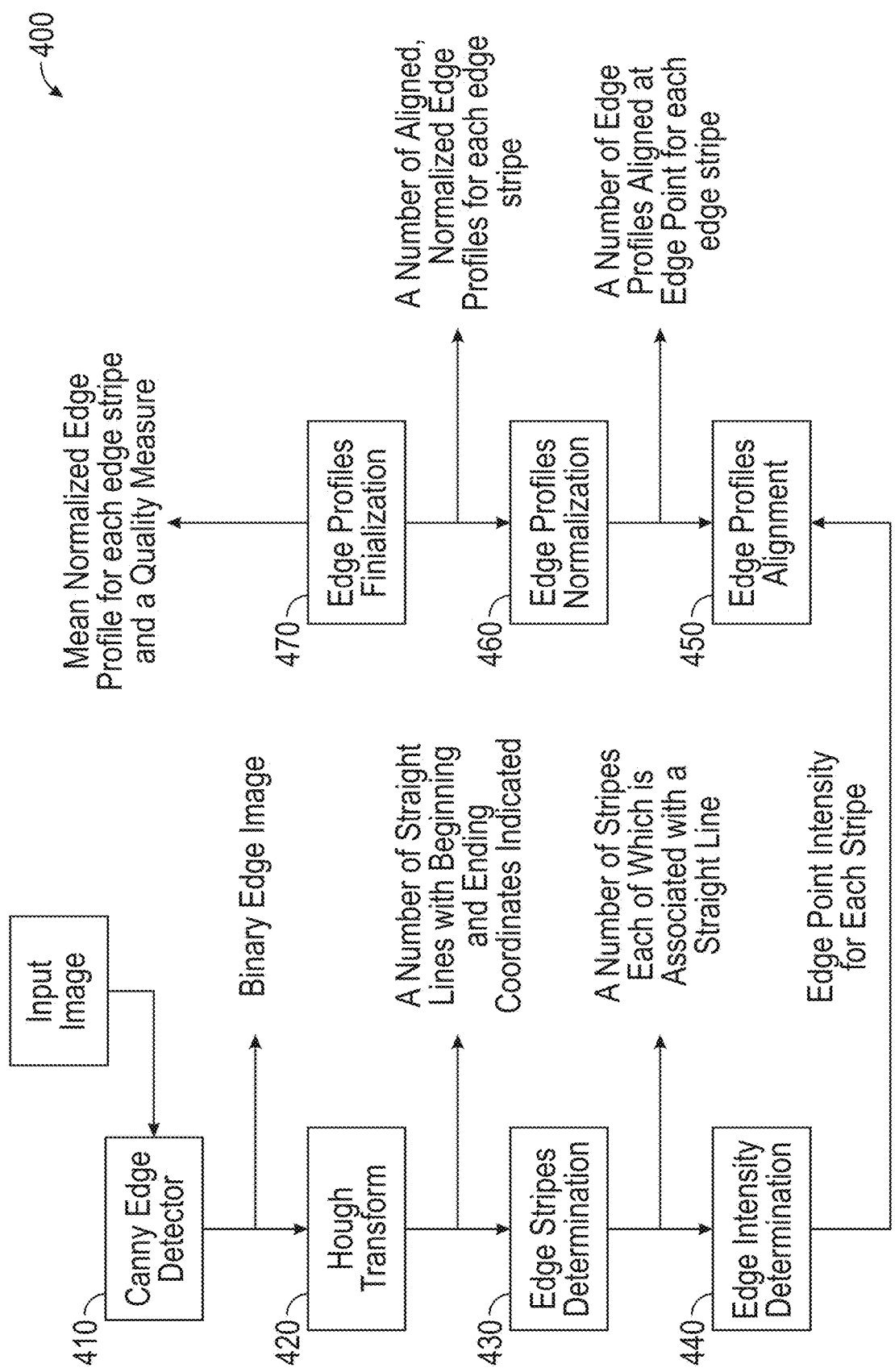
FIG. 4 illustrates an edge profile extraction flowchart, in accordance with embodiments of the disclosure.

Referring now to FIG. 4, an edge profile extraction flowchart 400 that may be employed by edge detector 130 is presented. In accordance with some representative embodiments, a number of modules such as Canny Edge detector 410, Hough Transform 420, Edge Stripes determination 430, Edge Intensity Determination 440, Edge Profiles Alignment 450, Edge Profiles Normalization 460, and Edge Profiles Finalization 470, are employed in this flow, though the workflow may be carried out by other modules operable to provide edge profile extraction.

Figure 5:
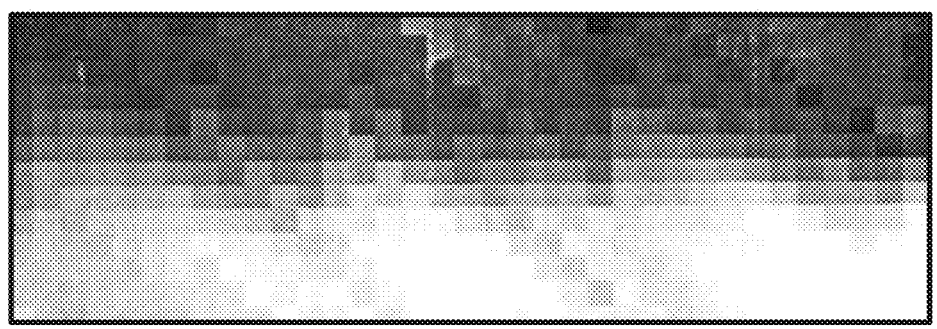
FIG. 5 illustrates a sample extracted edge stripe, in accordance with embodiments of the disclosure.

The first two modules, Canny Edge detector 410 and Hough Transform 420, are employed to extract line edges from an input image, such as raw image 120. Canny Edge detector 410 provides a binary edge image and Hough Transform 420 provides a number of straight lines with beginning and ending coordinates indicated. For each extracted line edge, the Edge Stripes Determination module 430 extracts the corresponding edge stripe to yield a number of strips, each of which is associated with a straight line. A sample extracted edge stripe is provided in FIG. 5.

Still referring to FIG. 4, next, an Edge Intensity Determination module 440 is used to determine the intensity value, I, which defines the edge point in each column of the edge stripes. Before an edge point can be decided, the maximum and minimum intensity values, which will be normalized to one and zero, respectively, are defined. The intensity value of an edge defines an edge point in each column of the edge strip. Taking into account the possibility of an edge overshoot, the maximum intensity for an edge may be taken as the median of the intensities of the first two rows of the bright side of each edge stripe. Rather than the minimum value, the minimum intensity is taken as a percentile (the fifth ($5^{th}$) percentile is used in the example) of the edge stripe to eliminate the possible outliers in each edge stripe. These values are examples; other minimum and maximum intensity values may be employed without departing from the scope of the present disclosure.

Once the maximum and minimum intensity values are defined for each edge stripe, their mean values are taken as the intensity value that defines an edge point. After the edge intensity of each edge stripe is obtained, the image compression estimation system and broker 100 finds the edge center of each edge profile. This may be done, for example, by searching for the location of each edge profile whose intensity is within a very small region (δ-neighborhood) of the edge intensity determined in the previous step; where δ is a pre-defined small threshold value such that I=I±Iδ (e.g., δ=±0.02).

Once the edge center is found for each edge profile, intensity values are resampled at an array of positions centered at each edge center.

In order to compute the RER value, the edge profile has to be normalized from 0 to 1 as illustrated in FIG. 3. In the module Edge Intensity Determination module 440, the maximum and minimum intensity values within an edge stripe are determined.

The maximum and minimum intensity values are denoted as $I_{max}$ and $I_{min}$. The Edge Profile Normalization module 460 performs edge profile normalization as $I_n=(I-I_{min})/(I_{max}-I_{min})$, where $I_n$ is the normalization intensity and I is the original intensity of a pixel of the raw edge profile, and $I_{max}$ and $I_{min}$ are the maximum and minimum intensity values determined for each edge stripe, respectively.

The Edge Profiles Finalization module 470 produces a single edge profile for each edge stripe along with a quality measure, Q. The final single edge profile is obtained by averaging the raw edge profiles of each edge stripe. However, not all average edge profiles of each edge stripe are equally reliable. The Edge Profiles Finalization module 470 produces, in addition to the mean edge profile, a quality measure based on variances of the raw edge profiles defined as:

$$Q_j = \frac{1}{N}\sum_{i=1}^{N}|\hat{I}_i - \hat{I}_{mean}|^2 \qquad (5)$$

where N is the number of raw edge profiles in the edge stripe of interest, $\hat{I}_i$ is the ith raw edge profile, and $\hat{I}_{mean}$ is the mean edge profile. To select the edge profile that best represents the given image for relative edge response computation, a set of mean edge profiles whose variances, σ, are within the least 10% of the mean edge profiles (or a z-score of <0.125 of a normal distribution) available, is selected in the given image. The selection of the z-score determines how many edge profiles are sampled where a larger number indicates more profiles are sampled. The mean RER value is used as the relative edge response value of the image.

After obtaining an edge profile, the relative edge response (RER) is determined by taking the difference of the edge profile values at location +0.5 and −0.5 as can be seen in FIG. 3.

To estimate edge overshoot height, H, a normalized edge profile from −3 to 3 pixels from edge center is obtained. Then the maximum value between +1 to +3 pixels from edge center is taken as the edge overshoot H if it is greater than 1. Otherwise, the value at +1.25 pixel from the edge center is used as the H value.

Figure 6:
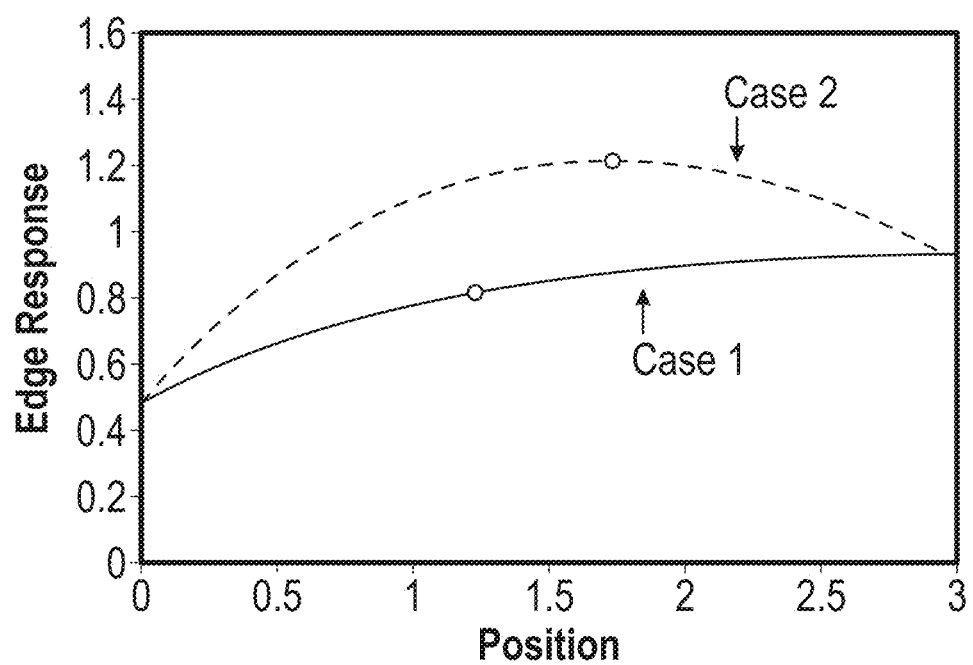
FIG. 6 illustrates edge overshoot height estimation from the edge profile used to determine NIIRS change, in accordance with embodiments of the disclosure.

The height overshoot estimation approach is graphically illustrated in FIG. 6, in which two cases are shown. Case 1 indicates undershoot in the edge profile. In this case, the value at position 1.25 pixel is adopted as the H value, which is about 0.8. In Case 2, the maximum value between 1 and 3 occurs at position 1.75 with value 1.2, which is greater than 1. Therefore, the H value in Case 2 is determined to be 1.2.

As previously mentioned, training data is obtained by applying the image analytics to a series of sequentially degraded images. The degraded images may be generated by sequentially blurring the simulated edge image with fixed sized ([23×23] pixels) Gaussian low-pass filters having different standard deviation values ranging from 0.2 to 3, such as illustrated in FIGS. 7A-7C, respectively. FIGS. 7A-7C accordingly show some of the resulting degraded images used for evaluation. After the generation of training data, a training function is used. For example, a neural network with one hidden unit may be trained to model the relationship between the gradient ratio and NIIRS degradation. Referring back to FIG. 2, the resulting CoDIFI is shown, where the plotted line in the drawing indicates the training data used from FIGS. 7A-7C.

Consider the following example approach based on a CoDIFI model provided to estimate NIIRS degradation due to compression. As a specific example of an implementation of FIG. 1, reference is made to the following actions:

Step 1: Use an edge detector, such as the Canny edge detector, to detect edges in the image before compression. Save all the edge points.

Step 2: Compute gradients at each edge point.

Step 3: Apply a selected compression scheme and an associated compression parameter set. The compression scheme may be user selected. Types of compression may be JPEG, JPEG 2000, and SPIHT for image compression, and H.264 and H.265 video compression for still image compression.

Step 4: Compute gradients at the same edge points detected in Step 1 in the compressed image.

Step 5: Compute the gradient ratio at each edge point and take the mean value of the gradient ratio ρ.

Step 6: Use CoDIFI to find the NIIRS degradation value corresponding to gradient ratio ρ.

As was previously described, a user may specify certain parameters, such as a maximum available bandwidth and bit rate of the system and/or a maximum acceptable image interpretability loss vis-à-vis a IIRS of interest. Accordingly, the system may accept two inputs from the operator user: the task description and the user requirement with regards to bandwidth and acceptable image data quality, which guides the system to recommend the best compression setting to achieve the user's stated acceptable performance.

Figure 8:
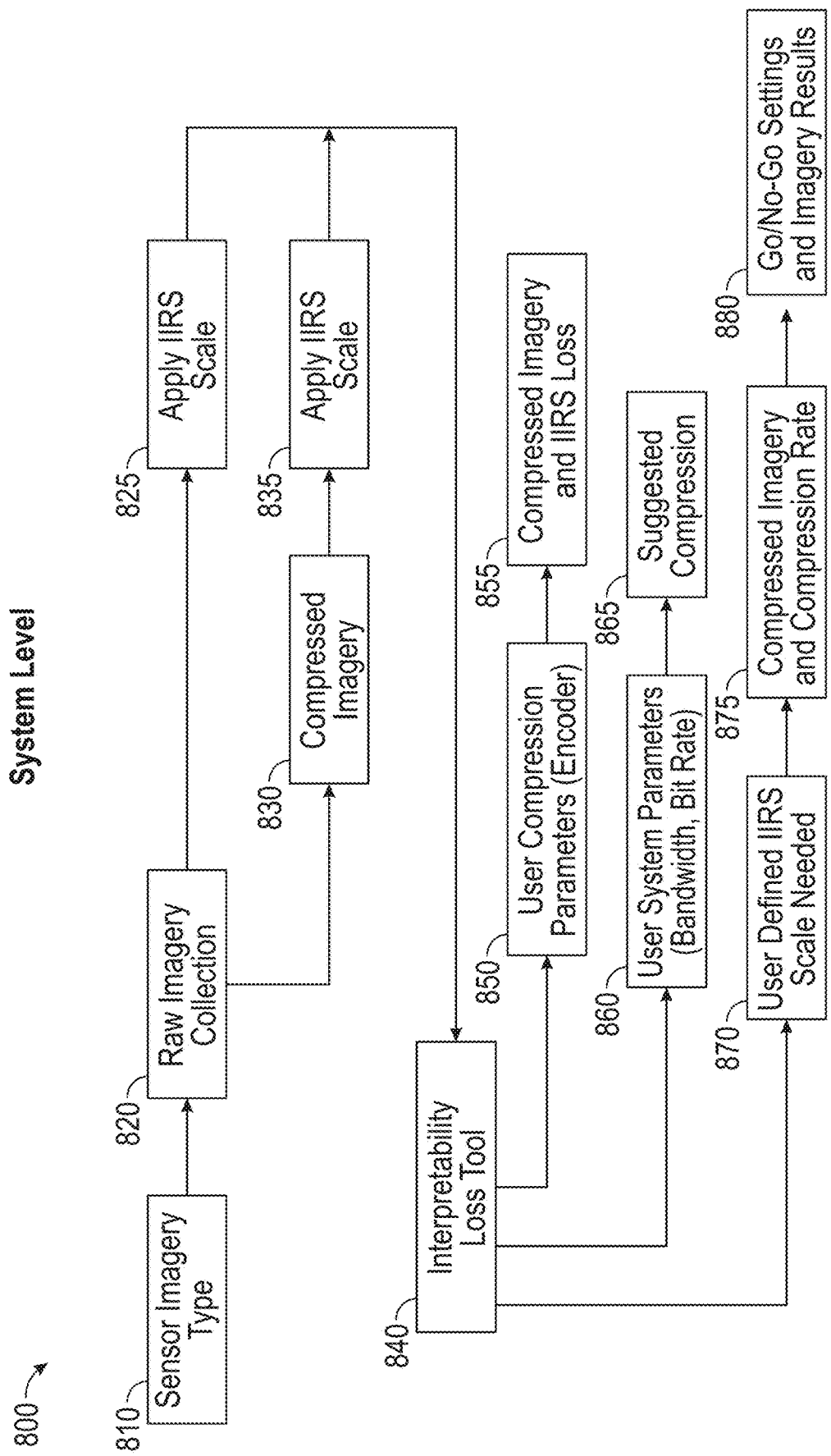
FIG. 8 is a system level functional flowchart, in accordance with embodiments of the disclosure.

Referring now to FIG. 8, system level functional block diagram 800 is shown. Sensors capture imagery of various types at 810. One or more raw images are collected at 820 and corresponding one or more compressed images are generated at 830. The applicable IIRS is applied to the raw/uncompressed images and compressed images at blocks 825 and 835, respectively. The ratings generated at 825 and 835 are provided to interpretability loss toll 840. Using interpretability loss tool 840, a user can choose a variety of parameters. At 850, the user can set encoder compression parameter settings, used to generated compressed imagery and IIRS interpretability loss at 855. The user can provide system parameters, such as system bandwidth and/or bit rate at 860; these parameters are used by the data compression broker to suggest a compression value that will meet the data quality, i.e. IIRS, requirements of the user, which are set at blocks 870 and 875. These settings and image interpretability loss are available, given all the aforementioned inputs, at block 880.

Figure 9:
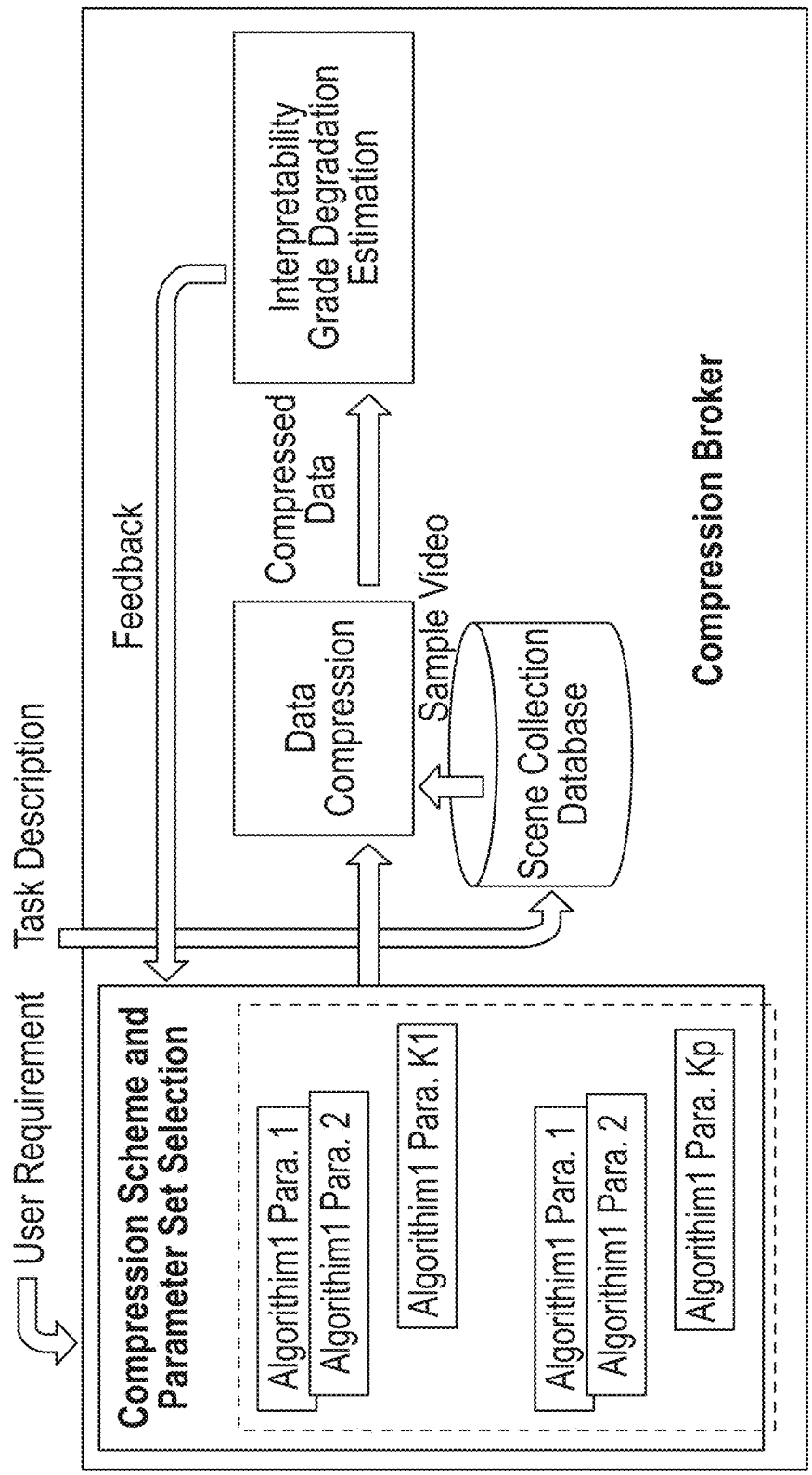
FIG. 9 is a block diagram that illustrates an image data compression broker, in accordance with embodiments of the disclosure.
Figure 10:
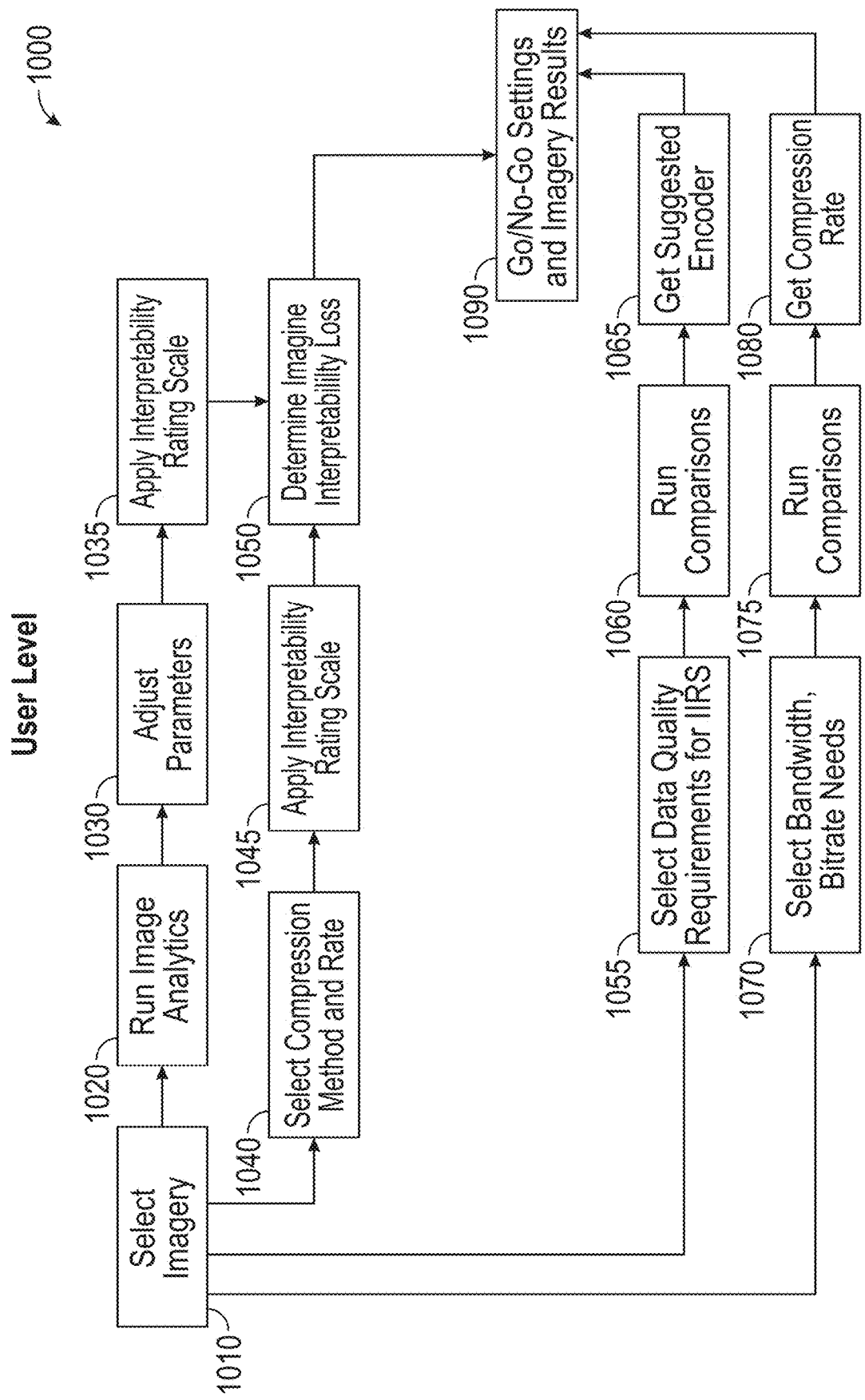
FIG. 10 illustrates a user level flowchart, in accordance with embodiments of the disclosure.

An example image data compression broker is illustrated in the block diagram of FIG. 9, in which the interplay between user set requirements, data compression and interpretability loss estimation, previously described, is illustrated. In accordance with various embodiments, inputs provided from the user are used in the data compression broker, as illustrated in the user level workflow 1000 of FIG. 10. At block 1010, the imagery to be analyzed is selected. If the image is uncompressed (raw), image analytics are run at block 1020 and parameters adjusted as needed at block 1030. At block 1035, the chosen IIRS is applied and the results provided to Block 1050. If the imagery is to be compressed, the user selects a compression method and rate at block 1040, to which the chosen IIRS is applied and the results provided to block 1050. At block 1050, the image interpretability loss due to compression is determined given the IIRS results from blocks 1035 and 1045. The image interpretability loss caused by compression is provided at block 1090.

The user further inputs to the system data quality requirements for the particular IIRS being used at block 1055 and well as selects system bandwidth and data bit rate needs at block 1070. Comparisons using this user-set information are performed at blocks 1060 and 1075, respectively. At block 1065, the system chooses an encoder suggested by the data compression broker given the user's data quality requirements and the results of the test data. At block 1080, the system establishes an image compression rate in accordance with the system bandwidth and bit rate parameters provided by the user.

Consider the following example in which a V-NIIRS rating scale and video H.264 compression are applied. From the information provided in the two tables of FIG. 11, presented in an example graphical user interface (GUI) arrangement shown, it can be seen that the user may set a number of parameters, including selection of the scene to be compressed, the type of compression, frame rate, duration, bitrate, etc. The image compression broker provides, in real-time, the V-NIIRS score, GSD, RER, H, G, predicted bitrate, etc. responsive to inputs provided by the user.

Figure 13:
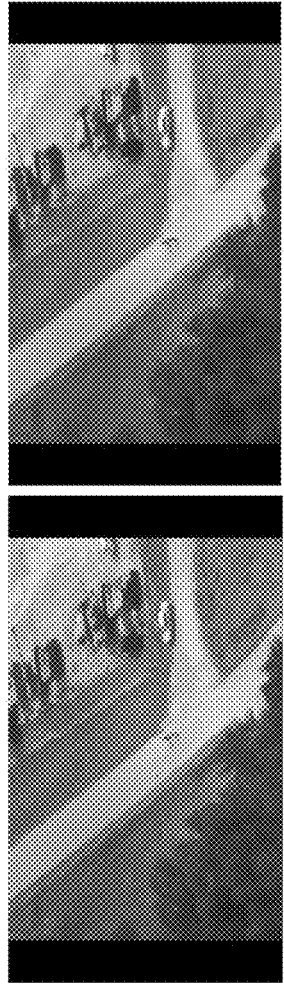
FIG. 13 illustrates use of a data compression broker for a video application, in accordance with embodiments of the disclosure.

Consider a WAMI example in which selected scene image information and compression loss estimation parameters used by a data compression broker are shown in FIG. 12. In this example, the user has set the minimum acceptable NNIRS score as 4 using JPEG 2000. It can be seen that the NIIRS of the raw image is 5.90, the user-specified target score is 4, and the actual NIIRS achieved is 3.94, very close to the target. FIG. 13 illustrates use of the data compression broker for a video application in which H.264 compression is used. Using the compression broker, an actual average V-NIIRS of 7.10 is achieved, which compares favorably to the target V-NIIRS of 7.0 set by the user. While the selected encoders in FIG. 12 and FIG. 13 are shown as jpeg2000 and libx264 (associated with the H.264 compression standard), respectively, any number of codec versions may be used. For example, SPIHT and H.265 video compression for still image compression may be employed. As will be understood, there are a wide variety of video and image codecs that may be employed in accordance with the teachings of this disclosure. Reference to the following link provides a listing of available codecs in addition to the ones that have been discussed: https://en.wikipedia.org/wiki/List_of_codecs (Feb. 2, 2018). In accordance with the embodiments disclosed herein, any version may be chosen and returned by the user based upon user need for a particular configuration and environment.

It will be appreciated that the systems and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

What is claimed is:

1. A method of estimating image interpretability degradation associated with image compression, comprising:
    detecting first and second edge points of an uncompressed image and determining gradients corresponding to the first and second edge points of the uncompressed image;
    compressing in accordance with a compression parameter setting of a gradient determination module the uncompressed image to generate a compressed image and determining gradients corresponding to the first and second edge points in the compressed image, the first and second edge points located in the same position in the uncompressed and compressed images;
    determining from the gradients of the uncompressed and compressed images associated with the first edge point a first gradient ratio and determining from the gradients of the uncompressed and compressed images associated with the second edge point a second gradient ratio; and
    estimating from the first and second gradient ratios an image interpretability loss of the compressed image.

2. The method of claim 1, where the first edge point is a vertical edge point and the gradients associated with the first edge point are vertical gradients of the uncompressed and compressed images, the second edge point is a horizontal edge point and the gradients associated with the second edge point are horizontal gradients of the uncompressed and compressed images, and the image interpretability loss is given by a ratio of the geometric mean of the vertical and horizontal gradients of the first and second edge points, respectively.

3. The method of claim 2, where the image interpretability loss between the compressed and uncompressed images is given by $$\Delta IS = \pi \left( \frac{\sqrt[2]{G_h^1 \cdot G_v^1}}{\sqrt[2]{G_h^0 \cdot G_v^0}} \right),$$

where $G_v^0$ is the vertical edge point of the uncompressed image, $G_v^1$ is the vertical edge point of the compressed image, $G_h^0$ is the horizontal edge point of the uncompressed image, and $G_h^1$ is the horizontal edge point of the compressed image.

4. The method of claim 1, where estimating from the first and second gradient ratios the image interpretability loss of the compressed image is performed by an image interpretability loss estimation module operable to perform:
    estimating the image interpretability loss of the compressed image as a function of a ratio of the geometric mean of the first and second mean gradient values associated with the first and second edge points, respectively.

5. The method of claim 1, further comprising:
setting the compression parameter setting used in generating the compressed image to generate an image interpretability loss that is either less than a maximum interpretability loss value or less than a maximum available bandwidth of a system.

6. The method of claim 5, further comprising:
a user setting the image compression parameter setting of the image compression setting module.

7. The method of claim 6, further comprising the user adaptively setting a data compression rate based upon the estimated image interpretability loss.

8. The method of claim 5, where the maximum interpretability loss value is measured in terms of a National Imagery Interpretability Rating Scale (NIIRS) degradation.

9. The method of claim 5, where the maximum available bandwidth is defined by a maximum communication bitrate.

10. The method of claim 1, where detecting first and second edge points of the uncompressed image is performed by an edge detector.

11. A method of estimating image interpretability degradation associated with image compression, comprising:
detecting from an uncompressed image first and second edge points of the uncompressed image and determining first and second gradients corresponding to the first and second edge points in the uncompressed image;
compressing in accordance with a compression parameter setting of a gradient determination module the uncompressed image to generate a compressed image and determining third and fourth gradients corresponding to the first and second edge points in the compressed image, the first and second edge points located in the same position in both the uncompressed and compressed images;
determining from the first and third gradients a first gradient ratio of the first edge point and determining from the second and fourth gradients a second gradient ratio of the second edge point; and
estimating from the first and second gradient ratios an image interpretability loss of the compressed image.

12. The method of claim 11, where the first and second gradients are vertical and horizontal gradients of the uncompressed and the compressed image at the first and second edge points and further comprising:
determining a ratio of the geometric mean of the vertical and horizontal gradients at the first and second edge points; and
estimating the image interpretability loss of the compressed image from the ratio of the geometric mean of the vertical and horizontal gradients at the first and second edge points.

13. The method of claim 12, where the image interpretability loss between the compressed and uncompressed images is given by $$\Delta IS = \pi \left( \frac{\sqrt[2]{G_h^1 \cdot G_v^1}}{\sqrt[2]{G_h^0 \cdot G_v^0}} \right),$$

where $G_v^0$ is the vertical edge point of the uncompressed image, $G_v^1$ is the vertical edge point of the compressed image, $G_h^0$ is the horizontal edge point of the uncompressed image, and $G_h^1$ is the horizontal edge point of the compressed image.

14. The method of claim 13, further comprising:
setting the compression parameter setting used in generating the compressed image to generate an image interpretability loss that is either less than a maximum interpretability loss value or less than a maximum available bandwidth of a system.

15. A method of estimating image interpretability degradation due to image compression, comprising:
detecting a plurality of edges of an uncompressed image and determining from the plurality of detected edges a plurality of edge points;
determining gradients at two or more edge points of the plurality of edge points of the uncompressed image;
compressing the uncompressed image in accordance with a compression parameter setting of a gradient determination module to generate a compressed image;
determining gradients at the two or more edge points of the compressed image, the locations of the two or more edge points the same in both the uncompressed and compressed images;
determining at each of the two or more edge points a gradient ratio between the gradients of the uncompressed image and the gradients of the compressed image and determining a mean value of the determined gradient ratio at each of the two or more edge points; and
determining from the mean value of the gradient ratio at each of the two or more edge points an image interpretability loss.

16. The method of claim 15, further comprising:
setting the compression parameter setting used in generating the compressed image to generate an image interpretability loss that is either less than a maximum interpretability loss value or less than a maximum available bandwidth of a system.

17. The method of claim 15, where determining gradients at the two or more edge points is performed on two or more of the plurality of edge points retrieved from memory.

18. An image compression degradation estimation and broker system, comprising:
an image compression encoder that generates, in accordance with a compression parameter setting of the image compression encoder, a compressed image from a received uncompressed image;
a gradient determination module that determines gradients of a first edge point of both the uncompressed and compressed images received by the gradient determination module, determines gradients of a second edge point of both the uncompressed and compressed images, determines a first mean gradient value of the first edge point from the gradients of the uncompressed and compressed images associated with the first edge point, and determines a second mean gradient value of the second edge point from the gradients of the uncompressed and compressed images associated with the second edge point, the first and second edge points located in the same position in both the uncompressed and compressed images; and
an image interpretability loss estimation module that estimates an image interpretability loss of the compressed image based upon the first mean gradient value of the first edge point and the second mean gradient value of the second edge point.

19. The system of claim 18, where the first edge point is a vertical edge point and the gradients associated with the first edge point are vertical gradients of the uncompressed and compressed images, the second edge point is a horizontal edge point and the gradients associated with the second edge point are horizontal gradients of the uncompressed and compressed images, and the image interpretability loss is given by a ratio of the geometric mean of the vertical and horizontal gradients of the first and second edge points, respectively.

20. The system of claim 19, where the image interpretability loss between the compressed and uncompressed images is given by $$\Delta IS = \pi \left( \frac{\sqrt[2]{G_h^1 \cdot G_v^1}}{\sqrt[2]{G_h^0 \cdot G_v^0}} \right),$$

where $G_v^0$ is the vertical edge point of the uncompressed image, $G_v^1$ is the vertical edge point of the compressed image, $G_h^0$ is the horizontal edge point of the uncompressed image, and $G_h^1$ is the horizontal edge point of the compressed image.

21. The system of claim 18, where the image interpretability loss estimation module estimates the image interpretability loss of the compressed image as a function of a ratio of the geometric mean of the first and second mean gradient values associated with the first and second edge points, respectively.

22. The system of claim 18, further comprising:
an edge detector that defines the first and second edge points from the uncompressed image.

23. The system of claim 18, further comprising an image compression setting module of the image compression encoder that sets the compression parameter setting of the image compression encoder to generate an image interpretability loss value that is either less than a maximum interpretability loss value of the system or less than a maximum available bandwidth of the system.

24. The system of claim 23, where a user sets an image compression parameter setting of the image compression setting module.

25. The system of claim 24, where the user adaptively sets a data compression rate based upon the image interpretability loss estimated by the image interpretability loss estimation module.

26. The system of claim 23, where the maximum interpretability loss value is measured in terms of a National Imagery Interpretability Rating Scale (NIIRS) degradation.

27. The system of claim 23, where the maximum available bandwidth is defined by a maximum communication bitrate.

* * * * *